UNITED STATES PATENT OFFICE.

HECTOR M. SINCLAIR, OF ROCKY FORD, COLORADO.

CEMENT.

No. 859,527.  Specification of Letters Patent.  Patented July 9, 1907.

Application filed December 12, 1906. Serial No. 347,553.

*To all whom it may concern:*

Be it known that I, HECTOR M. SINCLAIR, a citizen of the United States, residing at Rocky Ford, in the county of Otero and State of Colorado, have invented certain new and useful Improvements in Cements, of which the following is a specification.

This invention relates to cement principally designed for metal joints and which may be used for repairing of all kinds of metal roofing, water tanks, troughs, repairing and setting skylight glasses, packing joints of pipes and wherever cement is required to close cracks, joints, or openings, in work of any nature, the cement being such as not to be affected by climatic changes, such as heat, cold, damp or dry weather.

In preparing about two gallons of cement, the following ingredients are combined in about the proportions specified, viz: To one gallon of pure distilled coal tar, add: 1½ pints pure asphaltum varnish, 4 pounds asbestos fiber (medium grade), 4 ounces red mineral (Venetian red), 8 ounces lamp black, 1 pound Mexican graphite, 12 ounces Portland cement, 3 ounces mica, 5 ounces red rosin pulverized, 5 ounces pulverized alum, 1½ ounces (Arm & Hammer) bicarbonate soda, 1 ounce sal soda, ½ ounce hyposulfite of soda, ½ ounce salt.

The ingredients are combined by agitation, a mill, or mixing machine, of suitable make being employed to effect a thorough blending of the constituents to insure the provision of a homogeneous mass.

The coal tar enables the cement to be spread and insures it clinging, or adhering, to the parts to be repaired, or made tight. The asphaltum likewise adds to the spreading quality of the cement and renders the same elastic and durable. The asbestos fiber enables the cement to withstand heat and adds to the compactness of the body and prevents the same from checking, or cracking, besides adding to the durability of the product. The fiber best adapted for the purpose is magnesia, or long grade, because it is tougher than any other kind. Red mineral, lamp black, graphite and Portland cement produce a cement having a body and also add to the durability thereof. The mica gives a slick surface and renders the cement pliable so as to spread easily as well as increasing its heat resisting qualities. The red rosin and pulverized alum cut the coal tar and asphaltum and make the cement quick setting, or hardening, as well as add to the body and causing the cement to adhere more firmly to the surface, or joint, to which it may be applied. The bicarbonate soda, sal soda, salt and hyposulfite of soda are preservatives against climatic changes and prevent the cement from checking, or cracking.

Having thus described the invention, what is claimed as new is:

The herein described cement comprising coal tar, asphaltum, varnish, asbestos, Venetian red, lamp black, graphite, Portland cement, mica, rosin, alum, bicarbonate, sal and hyposulfite of soda and salt in about the proportions specified.

In testimony whereof I affix my signature in presence of two witnesses.

HECTOR M. SINCLAIR. [L. S.]

Witnesses:
 ELWOOD W. SHAW,
 ARTHUR L. TENNEY.